(12) United States Patent
Tamura

(10) Patent No.: US 10,148,638 B2
(45) Date of Patent: Dec. 4, 2018

(54) AUTHENTICATION SERVER SYSTEM, METHOD, AND STORAGE MEDIUM

(71) Applicant: CANON KABUSHIKI KAISHA, Tokyo (JP)

(72) Inventor: Yu Tamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 15/175,988

(22) Filed: Jun. 7, 2016

(65) Prior Publication Data

US 2016/0366151 A1 Dec. 15, 2016

(30) Foreign Application Priority Data

Jun. 11, 2015 (JP) ................................. 2015-118353

(51) Int. Cl.
*H04L 29/06* (2006.01)

(52) U.S. Cl.
CPC ............................... *H04L 63/0807* (2013.01)

(58) Field of Classification Search
None
See application file for complete search history.

(56) References Cited

U.S. PATENT DOCUMENTS

2011/0030047 A1* 2/2011 Gao ...................... G06F 21/335
726/9
2015/0227732 A1* 8/2015 Doctor .................... G06F 21/31
726/4

FOREIGN PATENT DOCUMENTS

JP 2015-5202 A 1/2015

* cited by examiner

*Primary Examiner* — David Le
(74) *Attorney, Agent, or Firm* — Canon U.S.A., Inc. IP Division

(57) ABSTRACT

An authentication server system issues a first-type token for verification of whether a user operating a terminal is a valid user and a second-type token for verification of whether a service is usable with authority transferred to an authorized client cooperating with the service, verifies, based on a token received with a verification request and a scope regardless of a type of the issued token, and notifies a verification result.

14 Claims, 11 Drawing Sheets

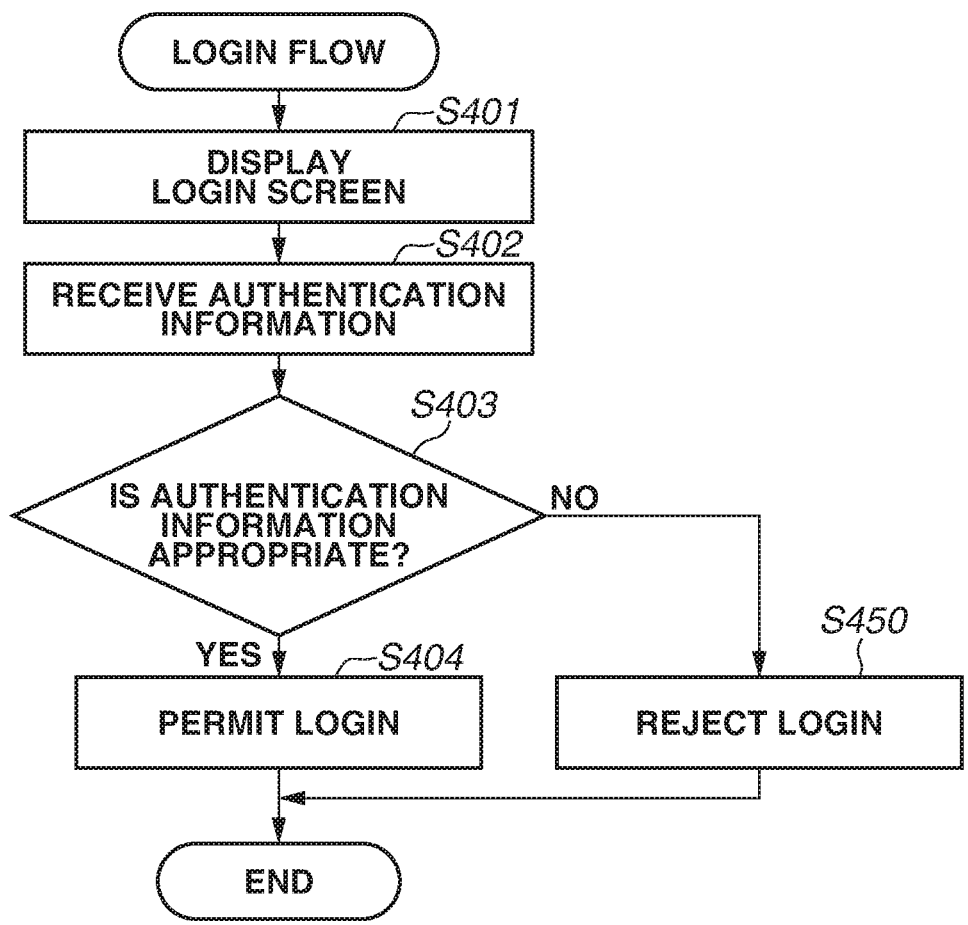

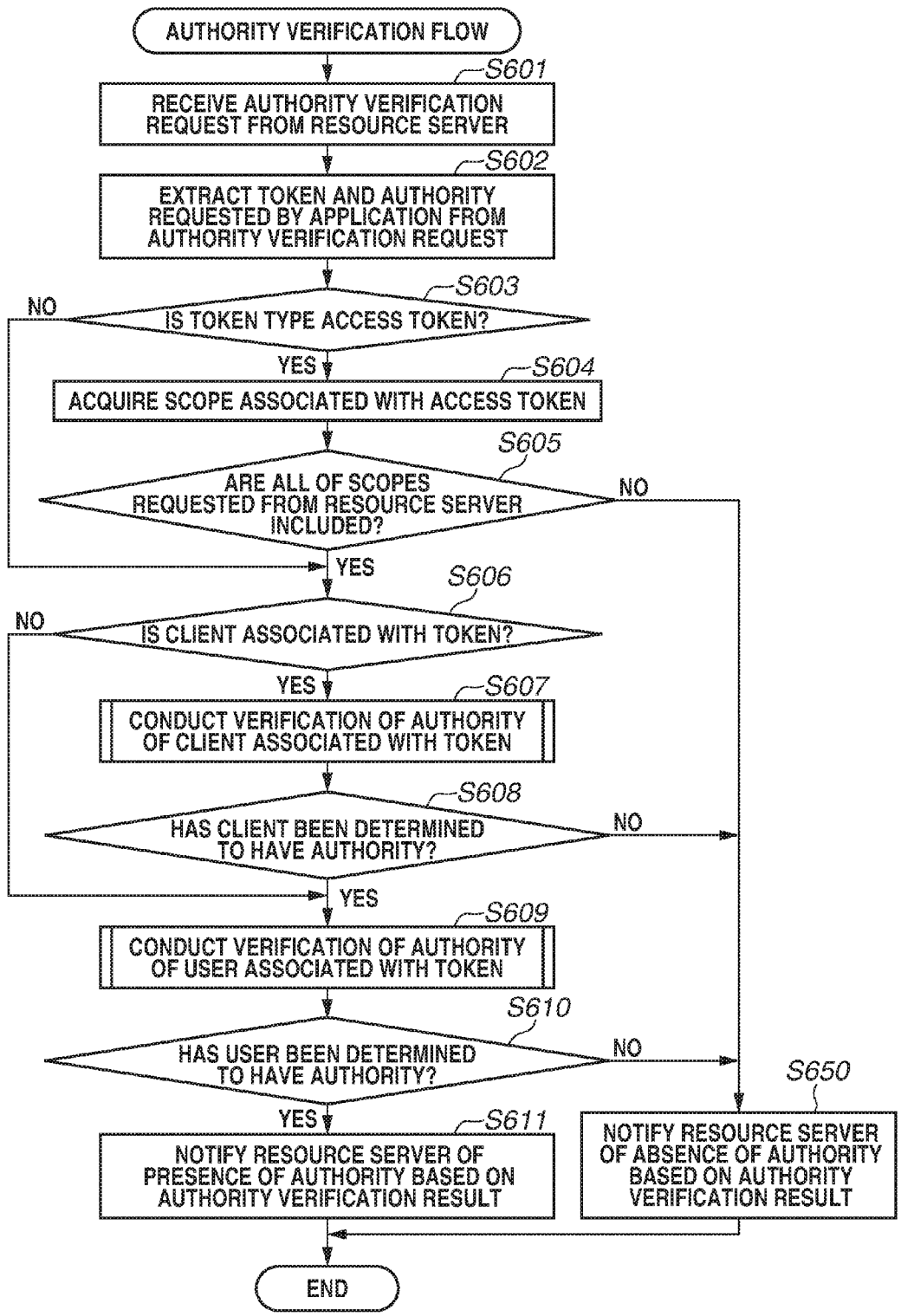

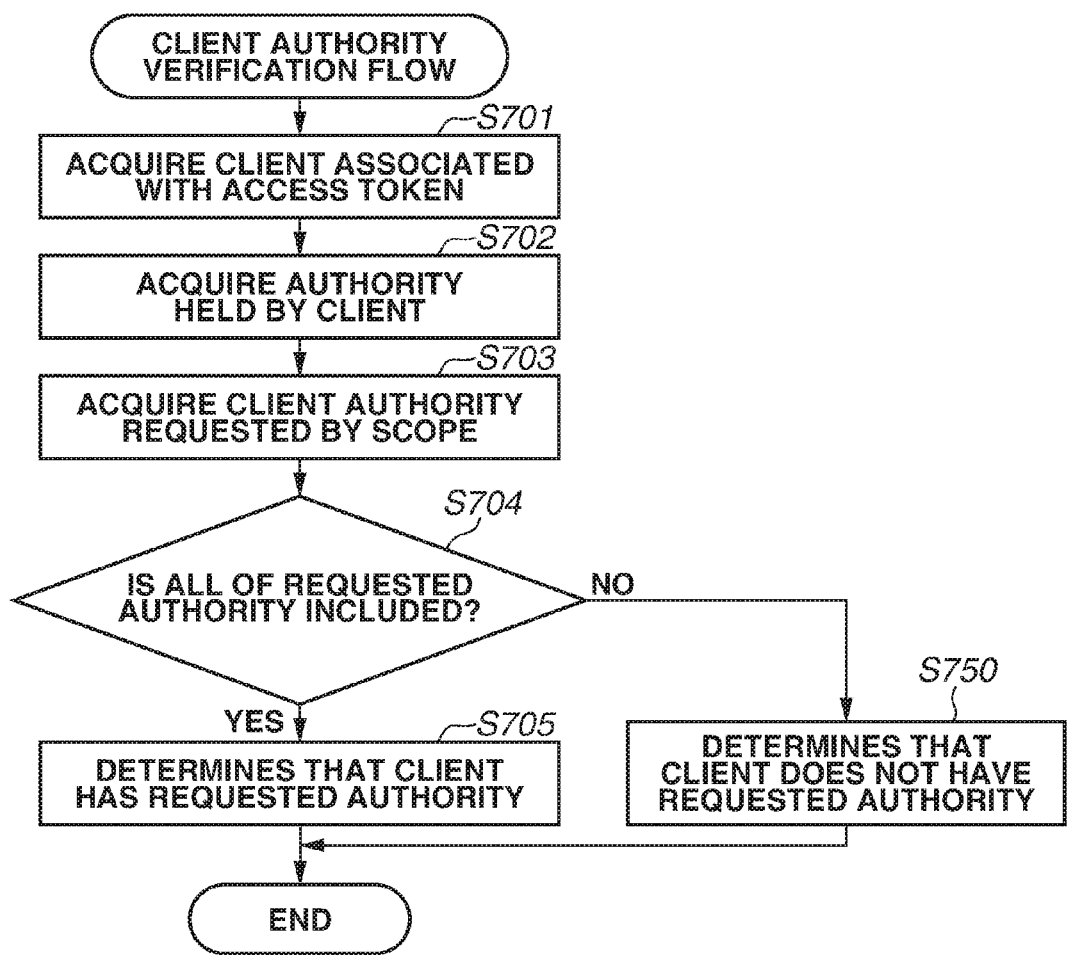

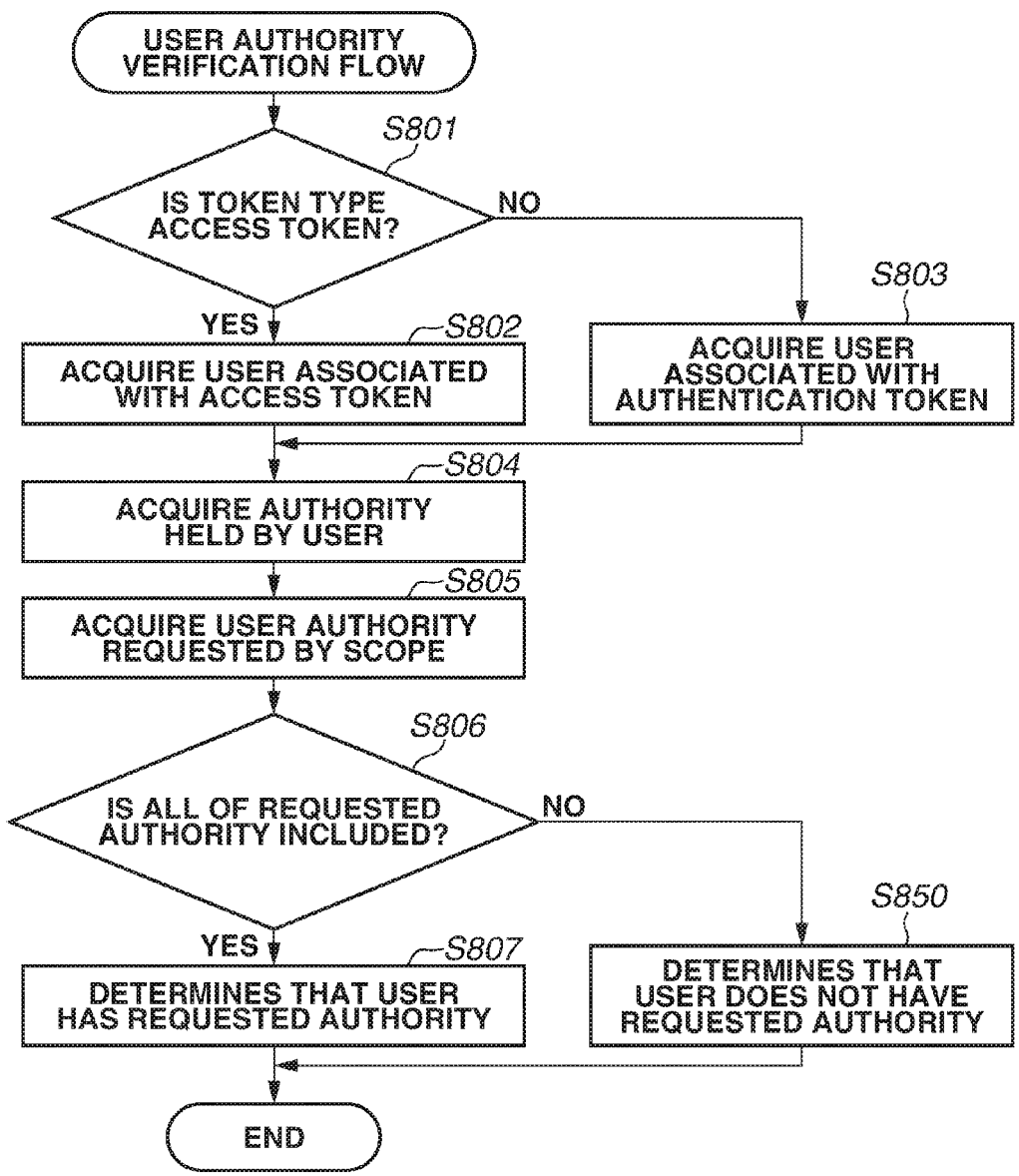

```
┌─────────────────────────────────┐
│       LOG IN TO SERVER          │
├─────────────────────────────────┤
│                                 │
│   USER ID    [ User X      ]    │
│                                 │
│   PASSWORD   [ ******** ]       │
│                                 │
│                                 │
│              [  LOG IN  ]       │
│                                 │
└─────────────────────────────────┘
```

```
┌─────────────────────────────────┐
│    AUTHORIZATION CONFIRMATION   │
├─────────────────────────────────┤
│ PERMISSION TO ACCESS YOUR       │
│ DATA IS REQUESTED.              │
│ PLEASE CHECK CONTENTS AND       │
│ PERMIT OR REJECT.               │
│   "DATA TO BE ACCESSED"         │
│   YOUR DATA IN REPOSITORY       │
│   "ACCESS SOURCE"               │
│   AppAm001 CLIENT               │
│                                 │
│     [ PERMIT ]    [ REJECT ]    │
└─────────────────────────────────┘
```

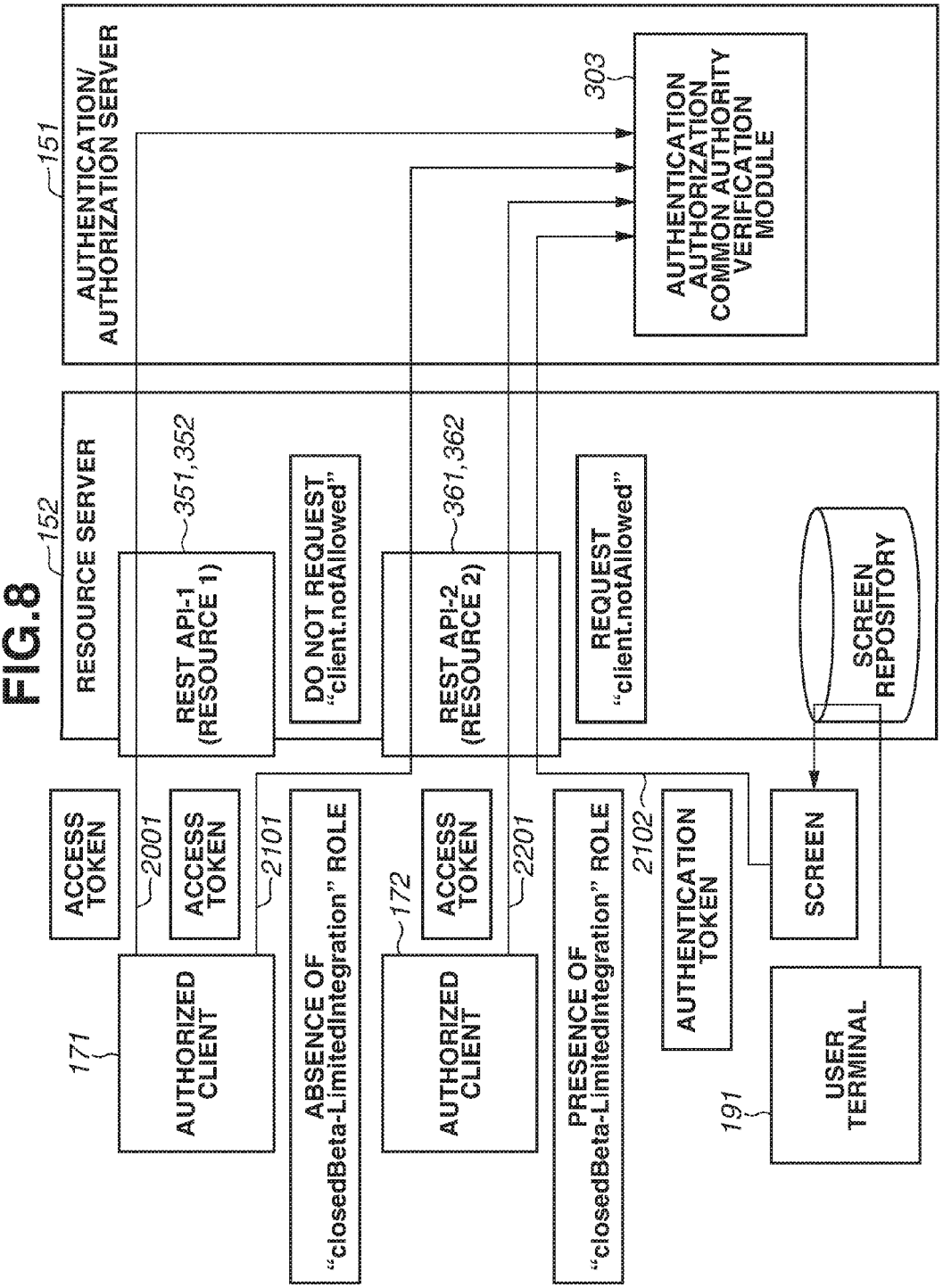

AUTHENTICATION SERVER SYSTEM, METHOD, AND STORAGE MEDIUM

BACKGROUND

Field

Aspects of the present invention generally relate to an authentication server system that conducts verification of authentication/authorization, and to a method and a storage medium.

Description of the Related Art

Generalization of cloud computing has provided more opportunities for a plurality of services to cooperate. The term "service" used herein represents a function provided by a server connected via a network such as the Internet. In other words, the term "service" represents a web application. The cooperation of the services enables a service provider to provide a new service to a user by adding value to a normal service. Issues can arise as part of the cooperation of the services.

That is, there is a possibility that more information than the user intends to exchange may be exchanged between the servers. This may cause a leakage of user data or personal information of the user. For example, a plurality of services on the Internet may cooperate with one another. In such a case, user data or personal information of a user should not be operated by any service other than a service authorized by the user. Moreover, from a service provider standpoint, it is desired that a service cooperation method be readily implemented.

Accordingly, the standard protocol called OAuth has been developed to achieve cooperation in authorization. According to the OAuth, for example, when an application in a certain terminal accesses data managed by a cloud service, the application is supposed to acquire explicit authorization from a user.

When the user authorizes the access, the application receives a token (hereinafter referred to as an access token) certifying that access authorization is granted. The application uses the access token for subsequent accesses. Hereinafter, an operation for issuance of an access token is referred to as an authorization operation. Japanese Patent Application Laid-Open No. 2015-5202 discusses a technique that uses the OAuth to issue an access token.

Intersystem cooperation according to the OAuth employs a web service such as representational state transfer (REST). Moreover, in recent years, architecture called RESTful model view controller (MVC) has been widely used. This has enabled a function to be provided by the REST with respect to not only the intersystem cooperation according to the OAuth but also a case where a user operates a screen.

Meanwhile, methods for providing functions may be standardized to the REST. Even in such a case, an authentication token is used when a user operates a screen, whereas an access token is used in intersystem cooperation. However, since verification of the authentication token and the access token differs, types of all tokens received by a REST application programming interface (API) need to be determined. Hence, a configuration for invoking a verification module corresponding to each type of the received token is necessary.

SUMMARY

Aspects of the present invention are directed to a configuration for enabling a token to be verified by a common module regardless of the type of the token.

According to an aspect of the present invention, an authentication server system communicable with an information processing apparatus including a service that provides a specific function to a terminal and an authorized client, includes an issuance unit configured to issue a first-type token for verification of whether a user operating the terminal is a valid user and a second-type token for verification of whether the service is usable with authority transferred to the authorized client cooperating with the service, and a verification unit configured to perform checking for verification based on a token received with a verification request and a scope from the information processing apparatus regardless of a type of the token issued by the issuance unit and to notify a verification result, wherein, the verification unit does not check authority associated with a token if the first-type token is received, and the verification unit checks authority associated with a token and determines whether the scope is within a range of the authority associated with the token if the second-type token is received.

Further features of aspects of the present invention will become apparent from the following description of exemplary embodiments with reference to the attached drawings.

BRIEF DESCRIPTION OF THE DRAWINGS

FIGS. 4A and 4B are respective flowcharts illustrating login processing and access token issuance processing according to the exemplary embodiment.

FIGS. 5A, 5B, and 5C are flowcharts illustrating authority verification processing according to the exemplary embodiment.

FIGS. 6A and 6B are diagrams each illustrating a display example of a screen according to the exemplary embodiment.

FIG. 8 is a schematic diagram illustrating authority verification according to the second exemplary embodiment.

DESCRIPTION OF THE EMBODIMENTS

Hereinafter, exemplary embodiments of the present invention are described with reference to the drawings.

Figure 1:
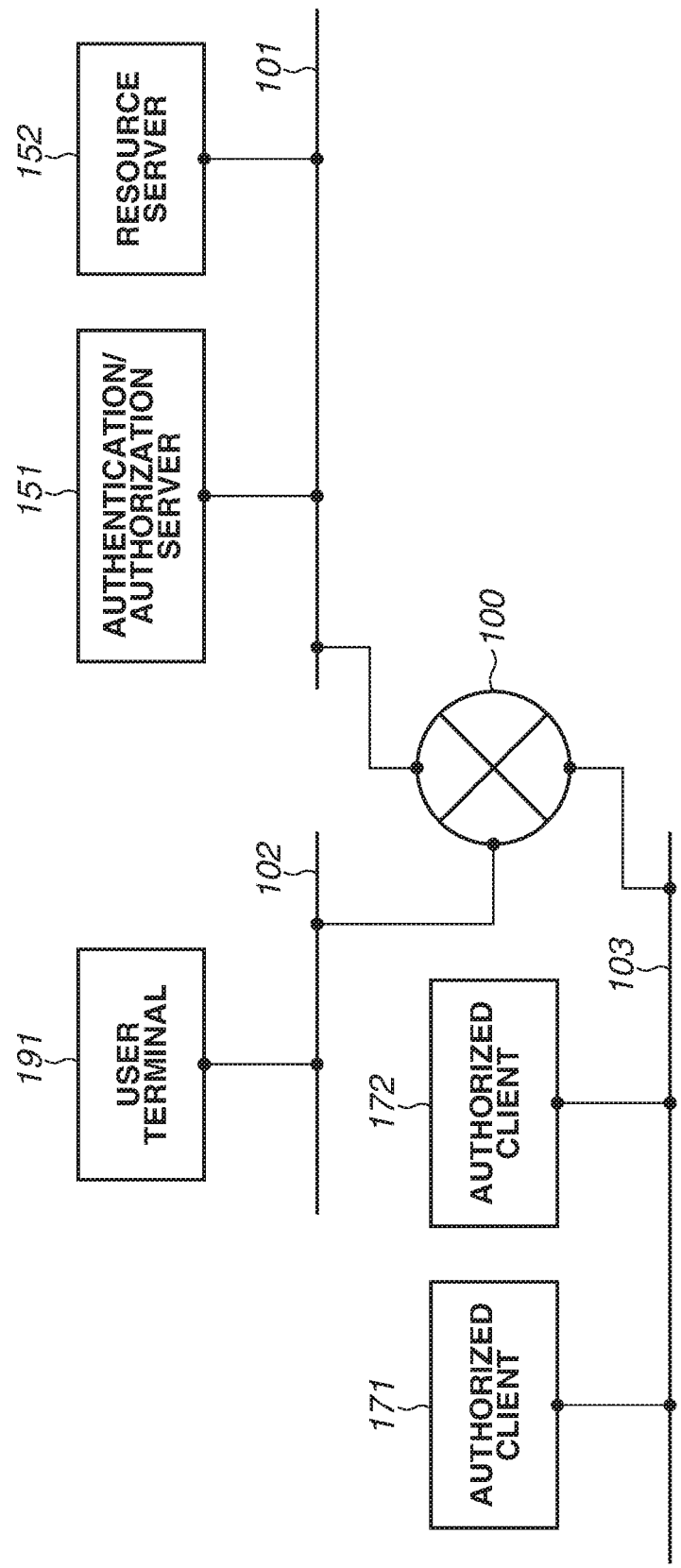
FIG. 1 is a diagram illustrating a network configuration.

An authority transfer system according to a first exemplary embodiment of the present invention is provided on a network as illustrated in FIG. 1, and components in the system are communicable with one another. The system illustrated in FIG. 1 includes a wide area network (WAN) 100 and local area networks (LANs) 101, 102, and 103. In the exemplary embodiment of the present invention, the WAN 100 includes a world wide web (WWW) system, and each of the LANs 101, 102, and 103 connects the components in the system.

Moreover, the system illustrated in FIG. 1 includes an authentication/authorization server 151, a resource server 152, a user terminal 191 that is operated by a user, and authorized clients 171 and 172. The authentication/authorization server 151 authenticates a user and issues an access token. The term "access token" used herein represents certification in which an application has been permitted to perform a certain operation by a user. The access token is issued when the user performs an authorization operation with respect to the application. For example, if an access token for accessing data managed by a cloud service is used, an application provides a state such that the data can be accessed within a range permitted by the user. The authorized clients 171 and 172 use authority transferred from the user to execute intersystem cooperation with the resource server 152.

Each of the authentication/authorization server 151 and the resource server 152 is connected via the WAN 100 and the LAN 102. Similarly, the user terminal 191 is connected via the WAN 100 and the LAN 102. The authorized clients 171 and 172 are connected via the WAN 100 and the LAN 103. The authentication/authorization server 151 and the resource server 152 can be arranged on separate LANs or the same LAN. Alternatively, the authentication/authorization server 151 and the resource server 152 can be arranged on the same personal computer (PC) or the same server computer. Although the system illustrated in FIG. 1 includes one authentication/authorization server 151 and one resource server 152, a server group including a plurality of servers may be arranged. For example, a server group including a plurality of authentication/authorization servers can be arranged. Accordingly, the exemplary embodiment of the present invention is described regardless of the presence of one server or a plurality of servers. In the present exemplary embodiment, the term "server system" includes either configuration. For example, an authentication server system includes one or a plurality of authentication servers.

Figure 2:
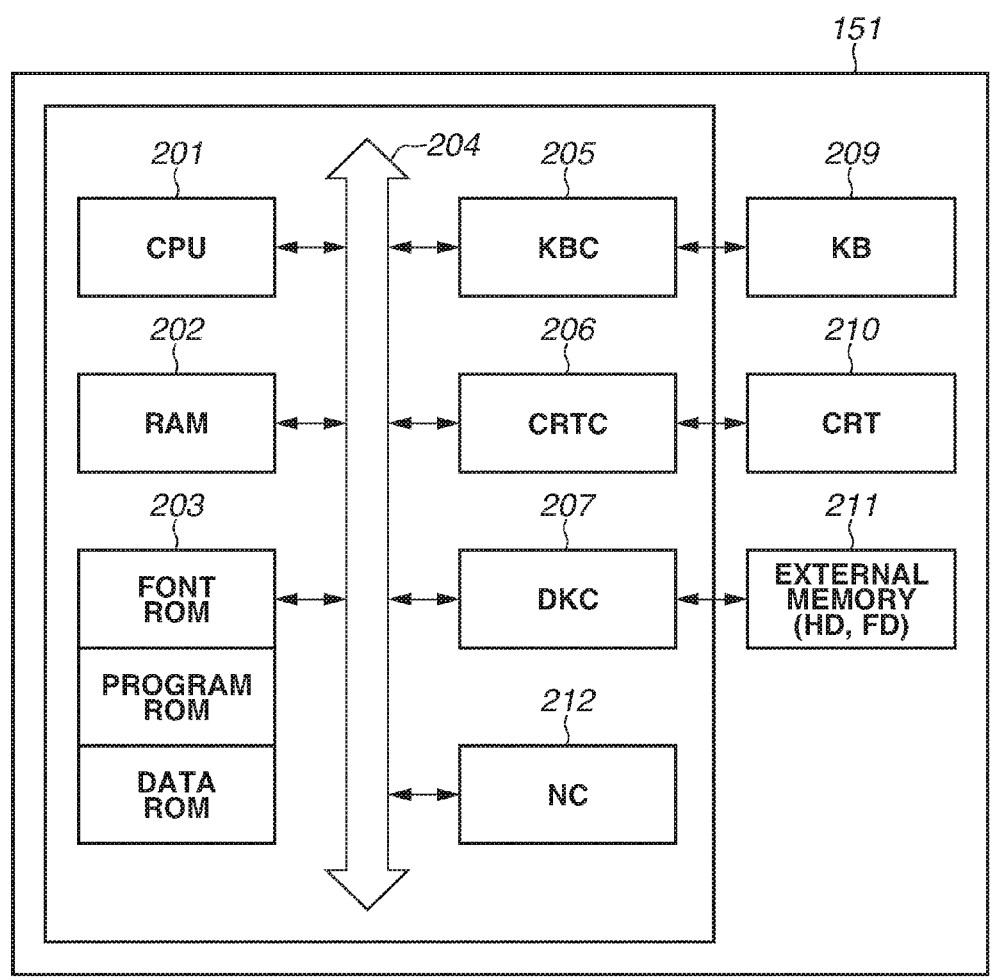
FIG. 2 is a diagram illustrating a configuration of a server computer according to an exemplary embodiment of the present invention.

FIG. 2 is a diagram illustrating a configuration of the authentication/authorization server 151 serving as a server computer according to the exemplary embodiment of the present invention. A configuration of the resource server 152 serving as a server computer, a configuration of the user terminal 191, and a configuration of each of the authorized clients 171 and 172 are similar to that illustrated in FIG. 2. The hardware block diagram illustrated in FIG. 2 corresponds to that of a general information processing apparatus, and the hardware configuration of the general information processing apparatus can be applied to the server computer according to the present exemplary embodiment and a mobile terminal.

In FIG. 2, a central processing unit (CPU) 201 executes an operating system (OS) or a program such an application, stored in a program read only memory (program ROM) of a ROM 203 or loaded into a random access memory (RAM) 202 from a hard disk 211. The OS operates on a computer. Execution of the program can realize processing of each flowchart described below. The RAM 202 functions as a main memory or a work area of the CPU 201. A keyboard controller (KBC) 205 controls a key entry from a keyboard (KB) 209 or a pointing device (not illustrated). A cathode ray tube controller (CRTC) 206 controls a display of a cathode ray tube (CRT) display 210. A disk controller (DKC) 207 controls access to data, for example, in a floppy (registered trademark) disk (FD) and a hard disk (HD) 211 in which various data is stored. A network controller (NC) 212 is connected to the network to execute control processing with respect to communication with other devices connected to the network. In the following description, the CPU 201 operates as a main element in terms of hardware, whereas an application program installed in the HD 211 operates as a main element in terms of software unless otherwise noted.

Figure 3A:
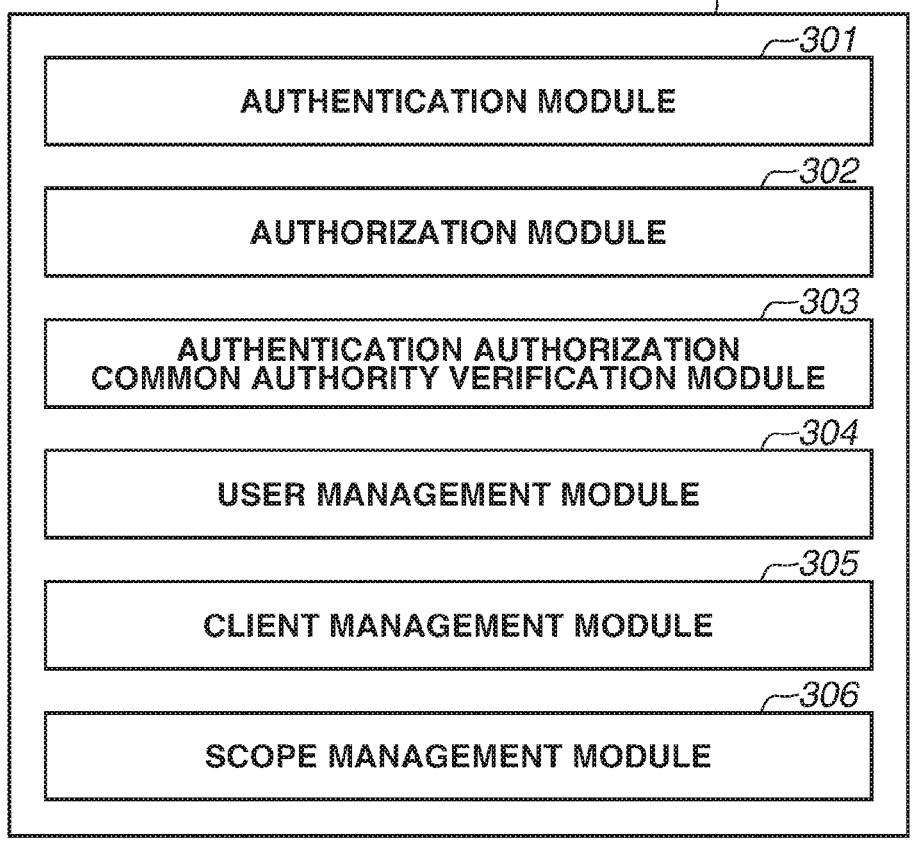
FIGS. 3A, 3B, and 3C are diagrams each illustrating a module configuration according to the exemplary embodiment.
Figure 3B:
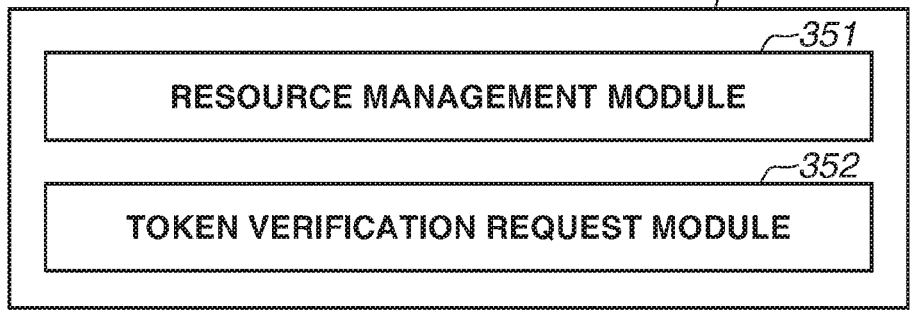
Figure 3C:

FIGS. 3A, 3B, and 3C are diagrams illustrating respective module configurations of the authentication/authorization server 151, the resource server 152, and the authorized client 171 according to the exemplary embodiment. The authentication/authorization server 151 includes an authentication module 301, an authorization module 302, and an authentication authorization common authority verification module 303. In addition, the authentication/authorization server 151 includes a user management module 304, a client management module 305, and a scope management module 306. The resource server 152 includes a resource management module 351 and a token verification request module 352. The authorized client 171 includes an access token request module 371 and a resource server access module 372. A configuration of the authorized client 172 is similar to that of the authorized client 171. Each of these modules includes an application program installed in the HD 211, and provides a server function when executed by the CPU 201.

FIG. 4A is a flowchart of login processing performed by the authentication/authorization server 151 according to the present exemplary embodiment. The flow illustrated in FIG. 4A starts when the authentication/authorization server 151 receives a login request from the user terminal 191. In step S401, the authentication module 301 of the authentication/authorization server 151 transmits an authentication screen 1001 as illustrated in FIG. 6A to the user terminal 191. That is, a login screen is displayed on the user terminal 191. In step S402, the authentication module 301 receives authentication information input in the authentication screen 1001. In step S403, the authentication module 301 determines whether the authentication information received in step S402 is appropriate. If the authentication module 301 determines that the authentication information is appropriate and a user operating the terminal is a valid user (YES in step S403), the processing proceeds to step S404. On the other hand, if the authentication module 301 determines that the authentication information is inappropriate (NO in step S403), the processing proceeds to step S450.

In step S404, the authentication module 301 permits the user to log in and issues an authentication token. Then, the flow ends. The authentication token issued here is associated with the user and managed in an authentication token table as illustrated in Table 1.

TABLE 1

| AUTHENTICATION TOKEN IDENTIFIER | USER |
|---|---|
| An0011223344 | User X |
| An5566778899 | User Y |
| An7788990011 | User Z |
| . | . |
| . | . |
| . | . |

In step S450, the authentication module 301 rejects the login of the user, and the flow ends.

Figure 4B:
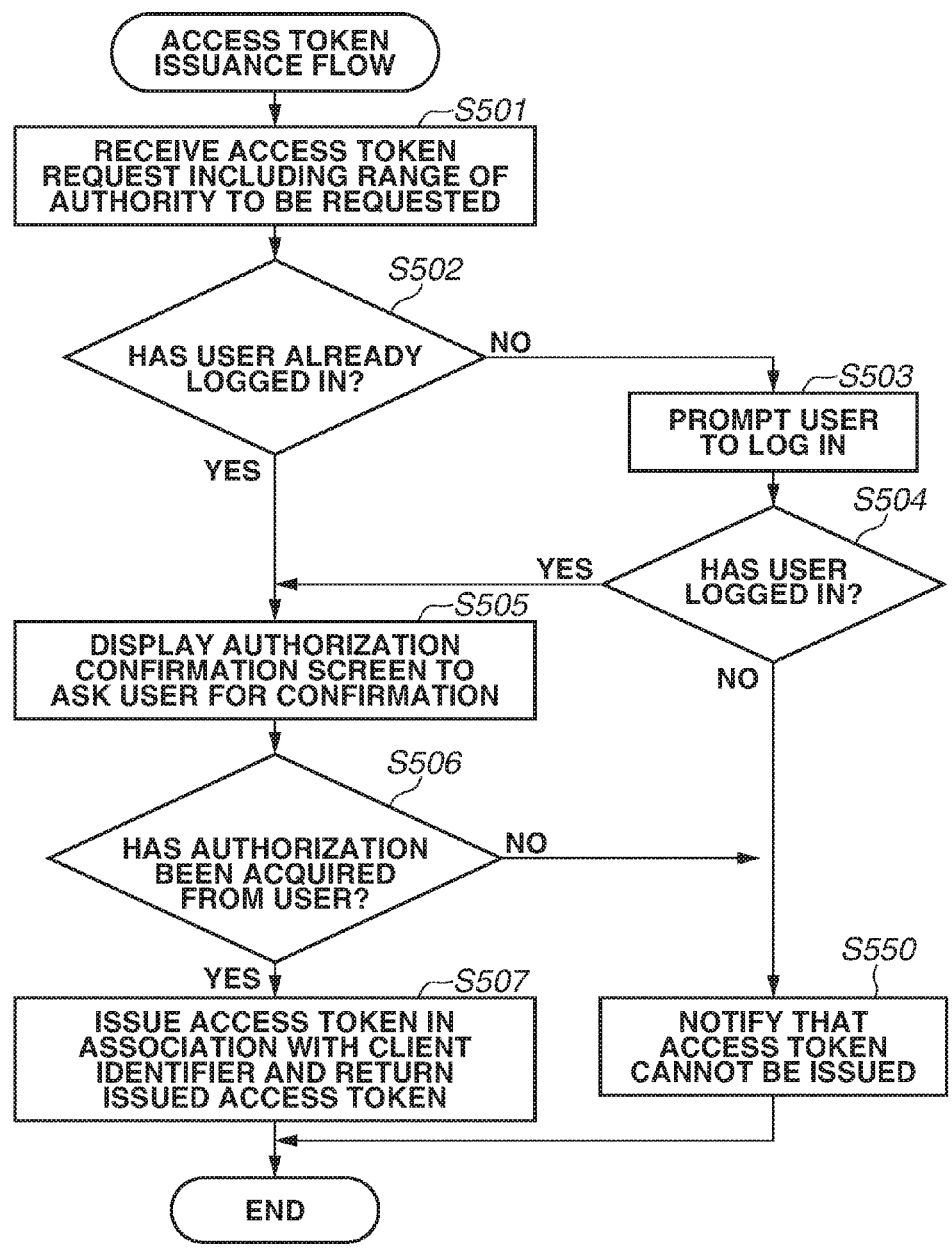

FIG. 4B is a flowchart of access token issuance processing performed by the authentication/authorization server 151 according to the present exemplary embodiment. The flow illustrated in FIG. 4B starts when the authorization module 302 of the authentication/authorization server 151 receives access token requests from the user terminal 191 and the authorized client 171. In step S501, the authorization module 302 receives access token requests from the user terminal 191 and the authorized client 171. The access token requests received here include user information and a client identifier, that is, a range of authority to be requested.

In step S502, the authorization module 302 determines whether the user operating the user terminal 191 has already logged in. If the authorization module 302 determines that the user has already logged in (YES in step S502), the processing proceeds to step S505. If the authorization module 302 determines that the user has not yet logged in (NO in step S502), the processing proceeds to step S503. In step S503, the authentication module 301 transmits the authentication screen 1001 as illustrated in FIG. 6A to the user terminal 191. That is, the authentication module 301 prompts user to log in. Login processing is substantially the same as that described in detail above with reference to FIG. 4A. In step S504, the authentication module 301 determines whether the user has logged in subsequent to the processing in step S503. If the authentication module 301 determines that the user has logged in (YES in step S504), the processing proceeds to step S505. If the authentication module 301 determines that the user has not logged in (NO in step S504), the processing proceeds to step S550.

In step S505, the authorization module 302 displays an authorization confirmation screen 1002 as illustrated in FIG. 6B on the user terminal 191 to ask the user for confirmation. In step S506, the authorization module 302 determines whether authorization has been acquired from the user in response to the processing in step S505. If the authorization module 302 determines that authorization has been acquired (YES in step S506), the processing proceeds to step S507. If the authorization module 302 determines that authorization has not been acquired (NO in step S506), the processing proceeds to step S550. When authorization is requested, the user can select "permission" on the screen as illustrated in FIG. 6B. Such an operation is referred to as an authorization operation. When the user performs the authorization operation, an access token is issued.

In step S507, the authorization module 302 issues an access token, and associates the client identifier in the access token request received in step S501 with user information in the access token request to store the resultant association in an access token table in Table 2. Moreover, the authorization module 302 returns the issued access token to the authorized client 171 via the user terminal 191, and the flow ends.

TABLE 2

| ACCESS TOKEN IDENTIFIER | USER | CLIENT IDEN- TIFIER | SCOPE |
| --- | --- | --- | --- |
| Az99887766 | User X | AppaAm001 | owner.App-A-ReadWrite, client.App-A-Integration |
| . | . | . | . |
| . | . | . | . |
| . | . | . | . |

In step S550, the authorization module 302 notifies the resource management module 351 that the access token cannot be issued, and the flow ends.

FIG. 5A is a flowchart illustrating verification processing of an authentication token and an access token by the authentication/authorization server 151. The flow illustrated in FIG. 5A starts when the authentication authorization common authority verification module 303 of the authentication/authorization server 151 receives an authority verification request from the token verification request module 352 of the resource server 152. Here, the authority verification request is made upon reception of a resource request from the user terminal 191 or the authorized client 171 by the resource management module 351 of the resource server 152.

In step S601, the authentication authorization common authority verification module 303 receives the authority verification request from the token verification request module 352 of the resource server 152. Here, the authority verification request includes the authentication token received by the resource management module 351 of the resource server 152 from the user terminal 191, or the access token received by the resource management module 351 of the resource server 152 from the authorized client 171. Moreover, the authority verification request includes a scope list necessary for the use of the resource requested by the user terminal 191 or the authorized client 171. That is, the authentication authorization common authority verification module 303 continuously receives information about the scope regardless of token type. The authentication authorization common authority verification module 303 can receive the authentication token and the information about the scope. Even in such a case, the authentication authorization common authority verification module 303 does not use the information about the scope in checking for verification, which will be described below.

The scope list necessary for the use of a recourse includes a scope to be requested by each of the user and the client, regardless of whether the token which has been received by the resource management module 351 is an authentication token or an access token. Accordingly, the resource server 152 can pass the same scope list to the authentication/authorization server 151 to request authority verification regardless of the type of the token received by the resource management module 351.

In step S602, the authentication authorization common authority verification module 303 extracts the authentication token or the access token and the scope list necessary for the use of the resource from the authority verification request received in step S601. In step S603, the authentication authorization common authority verification module 303 determines whether the type of the token extracted in step S602 is an access token. If the authentication authorization common authority verification module 303 determines that the token extracted in step S602 is an authentication token (NO in step S603), the processing proceeds to step S606. On the other hand, if the authentication authorization common authority verification module 303 determines that the token extracted in step S602 is an access token (YES in step S603), the processing proceeds to step S604.

In step S604, the authentication authorization common authority verification module 303 refers to an access token table as illustrated in Table 2 managed by the authorization module 302 to acquire the scope associated with the access token extracted in step S602. In step S605, the authentication authorization common authority verification module 303 determines whether the scopes, associated with the access token, acquired in step S604 include all scopes of the scope list extracted in step S602, the scope list being necessary for the use of the resource. In other words, the authentication authorization common authority verification module 303 determines whether the scopes are within a specific range of authority granted by the access token. If the authentication authorization common authority verification module 303 determines that all of the necessary scopes are included (YES in step S605), the processing proceeds to step S606. If the authentication authorization common authority verification module 303 determines that at least one necessary scope is not included (NO in step S605), the processing proceeds to step S650.

In step S606, the authentication authorization common authority verification module 303 determines whether a client is associated with the token extracted in step S602. As illustrated in Table 1, if the type of the token is an authentication token, the client is not associated. Moreover, as illustrated in Table 2, if the type of the token is an access token, the client is associated with the token. If the authentication authorization common authority verification module 303 determines that the client is associated with the token (YES in step S606), the processing proceeds to step S607. On the other hand, if the authentication authorization common authority verification module 303 determines that the client is not associated with the token (NO in step S606), the processing proceeds to step S609.

In step S607, the authentication authorization common authority verification module 303 conducts verification of the authority of the client associated with the token. In step S608, the authentication authorization common authority verification module 303, based on an authority verification result acquired in step S607, checks whether the client associated with the token has been determined to have the authority necessary for the use of the resource. If the authentication authorization common authority verification module 303 determines that the client has the necessary authority (YES in step S608), the processing proceeds to step S609. If the authentication authorization common authority verification module 303 determines that the client does not have the necessary authority (NO in step S608), the processing proceeds to step S650.

In step S609, the authentication authorization common authority verification module 303 conducts verification of authority of the user associated with the token. In step S610, the authentication authorization common authority verification module 303, based on an authority verification result acquired in step S609, checks whether the user associated with the token has been determined to have the authority necessary for the use of the resource. If the authentication authorization common authority verification module 303 determines that the user has the necessary authority (YES in step S610), the processing proceeds to step S611. If the authentication authorization common authority verification module 303 determines that the user does not have the necessary authority (NO in step S610), the processing proceeds to step S650. In step S611, the authentication authorization common authority verification module 303, based on the authority verification result, notifies the resource server that the token received by the authentication authorization common authority verification module 303 in step S601 has been determined to have the authority for the use of the resource, and the flow ends. In step S650, the authentication authorization common authority verification module 303 notifies the resource server that the token received by the authentication authorization common authority verification module 303 in step S601 has been determined to have no authority for the use of the resource, and the flow ends.

FIG. 5B is a flowchart illustrating client authority verification processing performed by the authentication/authorization server 151 according to the present exemplary embodiment. The flow illustrated in FIG. 5B is a detailed processing of step S607 described in FIG. 5A. In step S701, the authentication authorization common authority verification module 303 refers to an access token table managed by the authorization module 302 to acquire a client associated with an access token. For example, here, the access token may be Az99887766 shown in Table 2. In such a case, the authentication authorization common authority verification module 303 determines that the client associated with the access token is AppAm001.

In step S702, the authentication authorization common authority verification module 303 refers to a client authority table managed by the client management module 305 to acquire authority held by the client acquired in step S701. Table 3 illustrates an example of a client authority table.

TABLE 3

| CLIENT IDENTIFIER | AUTHORITY |
|---|---|
| AppAm001 | App-A-Integration |
| AppAm002 | App-B-Integration |
| . | . |
| . | . |
| . | . |

Here, if a client identifier is AppAm001, the client is determined to have authority of App-A-Integration.

In step S703, the authentication authorization common authority verification module 303 refers to a scope table managed by the scope management module 306 to acquire client authority to be requested by each scope of the scope list extracted in step S602. Table 4 illustrates an example of a scope list table.

TABLE 4

| SCOPE | AUTHORITY |
|---|---|
| owner.App-A-ReadWrite | App-A-ReadWrite |
| client.App-A-Integration | App-A-Integration |
| . | . |
| . | . |
| . | . |

Here, the scopes necessary for the use of the resource may be owner.App-A-ReadWrite and client.App-A-Integration. In such a case, since a scope to be requested by the client is client.App-A-Integration in which "client" is prefixed, client authority to be requested is determined to be App-A-Integration.

In step S704, the authentication authorization common authority verification module 303 determines whether the client authority acquired in step S702 includes all of the requested client-authority acquired in step S703. If the authentication authorization common authority verification module 303 determines that all of the requested authority is included (YES in step S704), the processing proceeds to step S705. If the authentication authorization common authority verification module 303 determines that at least one requested authority is not included (NO in step S704), the processing proceeds to step S750. For example, here, an access token may be Az99887766 shown in Table 2, and scopes necessary for resource use may be owner.App-A-ReadWrite and client.App-A-Integration. In such a case, the authority held by the client is App-A-Integration, and the client authority to be requested is also App-A-Integration. Accordingly, the client is determined to have all of the requested authority.

In step S705, the authentication authorization common authority verification module 303 determines that the client has the requested authority, and the flow ends. In step S750, the authentication authorization common authority verification module 303 determines that the client does not have the requested authority, and the flow ends.

FIG. 5C is a flowchart illustrating user authority verification processing performed by the authentication/authorization server 151 according to the present exemplary embodiment. The flow illustrated in FIG. 5C is a detailed processing of step S609 described in FIG. 5A. In step S801, the authentication authorization common authority verification module 303 determines whether the type of the token extracted in step S602 is an access token. If the authentication authorization common authority verification module 303 determines that the token is an authentication token (NO in step S801), the processing proceeds to step S803. If the authentication authorization common authority verification module 303 determines that the token is an access token (YES in step S801), the processing proceeds to step S802.

In step S802, the authentication authorization common authority verification module 303 refers to an access token table managed by the authorization module 302 to acquire a user associated with the access token. For example, here, the access token may be Az99887766 shown in Table 2. In such a case, the authentication authorization common authority verification module 303 determines that the user associated with the access token is User X.

In step S803, the authentication authorization common authority verification module 303 refers to an authentication token table managed by the authentication module 301 to acquire a user associated with the authentication token. For example, here, the authentication token may be An0011223344 shown in Table 1. In such a case, the authentication authorization common authority verification module 303 determines that the user associated with the access token is User X.

In step S804, the authentication authorization common authority verification module 303 refers to a user authority table managed by the user management module 304 to acquire authority of the user acquired in step S802 or step S803. Table 5 illustrates an example of a user authority table.

TABLE 5

| USER | AUTHORITY |
|------|-----------|
| User X | App-A-ReadWrite |
| User X | App-B-Read |
| User Y | App-A-Read |
| User Z | App-B-Read |
| . | . |
| . | . |
| . | . |

Here, if the user acquired in step S802 or step S803 is User X, the user is determined to have App-A-ReadWrite authority and App-B-Read authority.

In step S805, the authentication authorization common authority verification module 303 refers to a scope table managed by the scope management module 306 to acquire user authority to be requested by each scope of the scope list extracted in step S602.

Here, scopes necessary for the use of the resource may be owner.App-A-ReadWrite and client.App-A-Integration. In such a case, since a scope to be requested by the user is owner.App-A-ReadWrite in which "owner" is prefixed, the user authority to be requested is determined to be App-A-ReadWrite.

In step S806, the authentication authorization common authority verification module 303 determines whether the user authority acquired in step S804 includes all of requested user authority acquired in step S805. If the authentication authorization common authority verification module 303 determines that all of requested authority is included (YES in step S806), the processing proceeds to step S807. On the other hand, if the authentication authorization common authority verification module 303 determines that at least one requested authority is not included (NO in step S806), the processing proceeds to step S850. For example, here, the type of the token may be an authentication token of An0011223344 shown in Table 1, and scopes necessary for the use of the resource may be owner.App-A-ReadWrite and client.App-A-Integration. In such a case, the user has authority of App-A-ReadWrite, and the user authority to be requested is also App-A-ReadWrite. Accordingly, the client is determined to have all of requested authority.

In step S807, the authentication authorization common authority verification module 303 determines that the user has the requested authority, and the flow ends. In step S850, the authentication authorization common authority verification module 303 determines that the user does not have the requested authority, and the flow ends.

FIGS. 6A and 6B are diagrams each illustrating a display example of a screen according to the present exemplary embodiment. FIG. 6A illustrates an example of the authentication screen 1001 to be operated when the user logs in. FIG. 6B illustrates an example of the authorization confirmation screen 1002 to be used when the user authorizes a client module to permit issuance of an access token.

According to the present exemplary embodiment, the resource server 152 can pass the same scope list to the authentication/authorization server 151 to request authority verification regardless of the type of the token received by the resource management module 351. This enables a common authority verification module to be called without depending on the token type, and thus development efficiency of the resource server 152 is enhanced.

Next, a second exemplary embodiment of the present invention is described with reference to the drawings. Hereinafter, a description is only provided by referring to the differences between the first exemplary embodiment and the second exemplary embodiment. Descriptions of common components and configurations of the first and second exemplary embodiments will be omitted.

In the first exemplary embodiment, the resource server 152 can request token verification to the authentication/authorization server 151 without consideration of the token type. However, as for a certain resource of the resource server 152, it is conceivable that the use of the resource may be permitted with respect to an authentication token, but may not be permitted with respect to an access token. In such a case, the authentication/authorization server 151 needs to change determination of authority verification depending on the token type, whereas the resource server 152 should not consider the token type.

Moreover, a certain resource may not be initially permitted to be used with an access token. However, it is conceivable that such a resource can be permitted to be used with the access token when the resource server 152 is upgraded. In such a case, before formal publication of the use of the resource with the access token, publication of a function with respect to only a specific authorized client 172 is needed so that the function can be tested. The second exemplary embodiment of the present invention is made in view of the aforementioned.

Figure 7A:
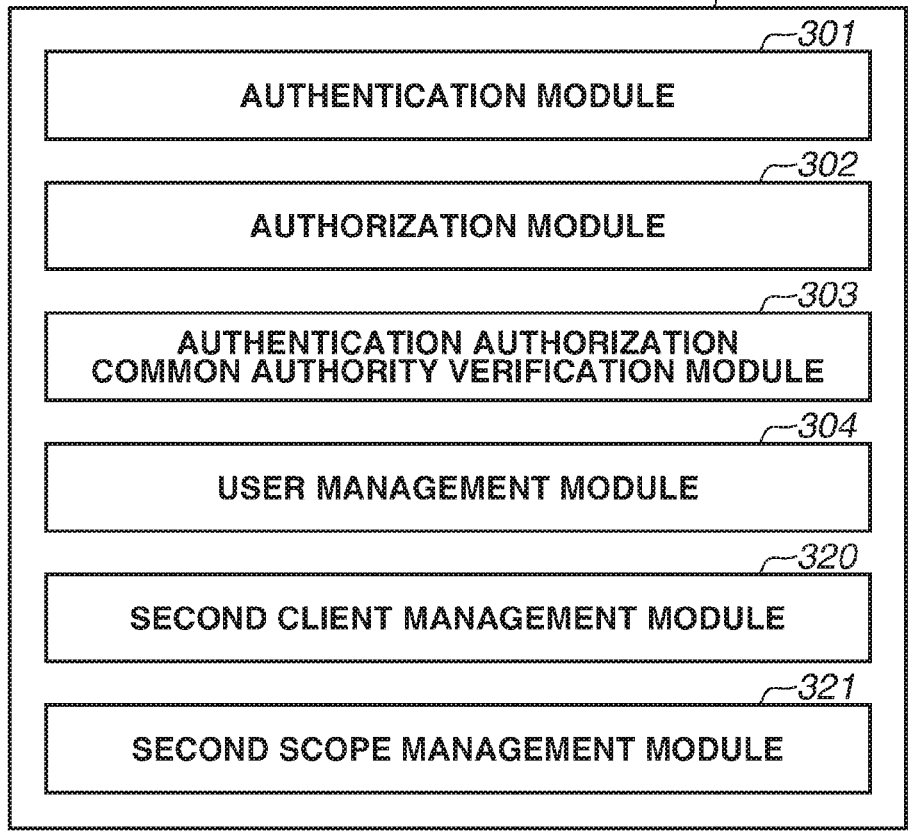
FIGS. 7A and 7B are diagrams each illustrating a module configuration according to a second exemplary embodiment of the present invention.
Figure 7B:
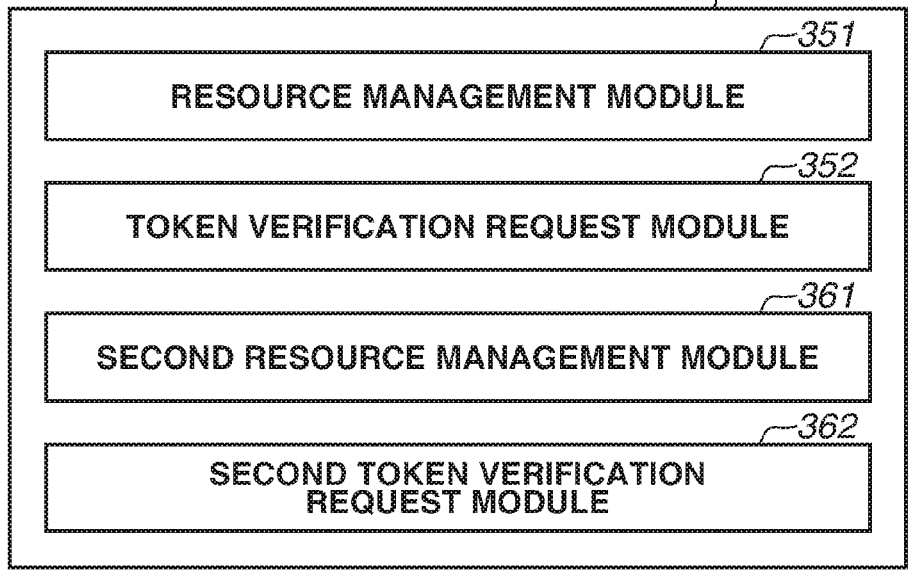

FIGS. 7A and 7B are respective diagrams illustrating a module configuration of an authentication/authorization server 151 and a module configuration of a resource server 152 according to the second exemplary embodiment of the present invention. The authentication/authorization server 151 includes an authentication module 301, an authorization module 302, and an authentication authorization common authority verification module 303. Moreover, the authentication/authorization server 151 includes a user management module 304, a second client management module 320, and a second scope management module 321. The resource server 152 includes a resource management module 351 and a token verification request module 352. Moreover, the resource server 152 includes a second resource management module 361 and a second token verification request module 362.

Table 6 illustrates an example of a second client authority table, and Table 7 illustrates an example of a second scope list table. The second client authority table and the second scope list table respectively are managed by the second client management module 320 and the second scope management module 321.

TABLE 6

| CLIENT IDENTIFIER | AUTHORITY |
|---|---|
| AppAm001 | App-A-Integration |
| AppAm002 | App-B-Integration |
| AppAmDebug | App-A-ReadWrite |
| AppAmDebug | closedBeta-LimitedIntegration |
| . | . |
| . | . |
| . | . |

TABLE 7

| SCOPE | AUTHORITY |
|---|---|
| owner.App-A-ReadWrite | App-A-ReadWrite |
| client.App-A-Integration | App-A-Integration |
| client.notAllowed | closedBeta-LimitedIntegration |
| . | . |
| . | . |
| . | . |

Here, a description is provided using an example of the client authority verification flow illustrated in FIG. 5B. In step S704, the authentication authorization common authority verification module 303 determines whether the client authority acquired in step S702 includes all of requested client authority acquired in step S703. For example, here, a client identifier associated with the access token may be AppAmDebug, and scopes necessary for the use of the resource may be owner.App-A-ReadWrite and client.notAllowed. In such a case, the client has authority including closedBeta-LimitedIntegration, thereby satisfying client authority to be requested, that is, closedBeta-LimitedIntegration. Accordingly, the client is determined to have all of the requested authority, and the processing proceeds to step S705.

In step S705, the authentication authorization common authority verification module 303 determines that the client has the requested authority, and the flow ends. Since the access token in the second exemplary embodiment is a token issued in association with the scope of client.notAllowed, the processing proceeds from step S605 to step S606. Accordingly, it is to be determined that there is no problem about the scope. However, as long as the client does not have authority, an authorized client 171 is not authorized to use the service, as described above.

FIG. 8 is a schematic diagram illustrating an authority verification request from the resource server 152 to the authentication/authorization server 151 in response to a resource request from a user operation and a different authorized client according to the second exemplary embodiment.

Here, assume that the authorized client 171 serves as a normal authorized client, and can only use general public REST API. Thus, the authorized client 171 does not have a closedBeta-LimitedIntegration role. Moreover, assume that the authorized client 172 serves as a special authorized client that tests REST API of the resource server 152 before publication of the REST API for access token. Since the authorized client 172 can use REST API which is not normally used with an access token, the authorized client 172 has a closedBeta-LimitedIntegration role.

Moreover, REST API-1 of the resource server 152 serves as REST API corresponding to the resource management module 351 and the token verification request module 352. A client.notAllowed scope is not requested from an authorized client that uses the REST API-1. Moreover, REST API-2 of the resource server 152 serves as REST API corresponding to the second resource management module 361 and the second token verification request module 362. A client.notAllowed scope is requested from an authorized client that uses the REST API-2.

In FIG. 8, an arrow 2001 indicates processing performed when the authorized client 171 calls the REST API-1. In the processing indicated by the arrow 2001, the authorized client 171 uses an access token acquired beforehand to call the REST API-1. Here, since client.notAllowed is not to be requested for the use of REST API-1, the authorized client 171 without a closedBeta-LimitedIntegration role can use the REST API-1.

An arrow 2101 indicates processing performed when the authorized client 171 calls REST API-2. In the processing indicated by the arrow 2101, the authorized client 171 uses an access token acquired beforehand to call the REST API-2. Here, since client.notAllowed is to be requested for the use of the REST API-2, the authorized client 171 without a closedBeta-limitedIntegration role cannot use the REST API-2.

An arrow 2102 indicates processing performed when a user terminal 191 calls the REST API-2. In the processing indicated by the arrow 2102, the user terminal 191 acquires a screen resource from a screen repository. Moreover, the user terminal 191 uses an authentication token acquired beforehand to call the REST API-2 via the acquired screen resource. Here, client.notAllowed is to be requested for the use of the REST API-2. However, if an authentication token is used, client authority verification is not conducted at the time of authority verification by the authentication authorization common authority verification module 303. Therefore, the user terminal 191 can use the REST API-2 regardless of the presence or absence of a closedBeta-LimitedIntegration role.

An arrow 2201 indicates processing performed when the authorized client 172 calls REST API-2. In the processing indicated by the arrow 2201, the authorized client 172 uses an access token acquired beforehand to call the REST API-2. Here, client.notAllowed is to be requested for the use of the REST API-2. However, since the authorized client 172 has a closedBeta-LimitedIntegration role, the authorized client 172 can use the REST API-2.

According to the second exemplary embodiment, in a use case using an access token, for example, a user is not directly involved in intersystem cooperation, the use of a resource can be prohibited. Even in such a case, in a use case using an authentication token, for example, the user directly operates a screen, the use of a resource can be permitted by a control operation. In such a case, the resource server 152 designates client.notAllowed of a predetermined scope to only request authority verification to the authentication/authorization server 151, and the resource server 152 does not need to consider a token type. Thus, development of the resource server 152 can be efficiently carried out.

According to the second exemplary embodiment, moreover, the authorized client 171 can be prohibited from using a certain resource of the resource server 152, and only the predetermined authorized client 172 can use a resource prior to formal release of the resource.

After the authorized client 172 executes adequate tests, the resource server 152 can be upgraded so as not to request client.notAllowed as a scope for the use of the aforementioned resource. Accordingly, publication of such a resource can be made with respect to the authorized client 171.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-118353, filed Jun. 11, 2015, which is hereby incorporated by reference herein in its entirety.

What is claimed is:

1. An authentication server system communicable with an information processing apparatus including a service that provides a specific function to a terminal and an authorized client, the authentication server system comprising:
   at least a processor; and
   at least a memory coupled to the at least the processor and having stored thereon instructions which, when executed by the at least the processor, cause the at least processor to act as:
   an issuance unit configured to issue a first-type token for verification of whether a user operating the terminal is a valid user and a second-type token for verification of whether the service is usable with authority transferred to the authorized client cooperating with the service; and
   a verification unit configured to perform checking for verification based on a token received with a verification request and a scope from the information processing apparatus, which is a requestor of the checking, regardless of a type of the token issued by the issuance unit and to notify a verification result,
   wherein, the verification unit does not check authority associated with a token if the first-type token is received, and the verification unit checks authority associated with a token and determines whether the scope is within a range of the authority associated with the token if the second-type token is received,
   wherein, in a case where the authorized client uses a first application programming interface (API) of the information processing apparatus, the information processing apparatus transmits the scope not including a value indicating a prohibition on use of the service using the second-type token to the verification unit and requests the verification unit to perform the checking, and
   wherein, in a case where the authorized client uses a second API of the information processing apparatus, the information processing apparatus transmits the scope including a value indicating a prohibition on use of the service using the second-type token to the verification unit and requests the verification unit to perform the checking.

2. The authentication server system according to claim 1, wherein the scope received by the verification unit from the information processing apparatus includes a scope for use of the service requested by the authorized client to the information processing apparatus.

3. The authentication server system according to claim 1, wherein, in a case where the authorized client uses the second API of the information processing apparatus, if the authorized client transmits the first-type token to the verification unit, which corresponds to a case where the verification unit does not check authority associated with the token, the verification unit notifies the information processing apparatus that the authorized client has the authority.

4. The authentication server system according to claim 1, wherein, if the second-type token is received, the verification unit checks authority associated with the authorized client based on the token and determines whether the scope is within a range of the authority associated with the authorized client, and
   wherein, if the scope is determined to be within the range of the authority associated with the token and the scope is determined to be within the range of the authority associated with the authorized client, the verification unit notifies that the service is usable with the authority transferred to the authorized client cooperating with the service, as a verification result.

5. The authentication server system according to claim 1, wherein, if authority associated with the authorized client is determined to be a specific authority, the verification unit notifies that the service is usable with the authority transferred to the authorized client cooperating with the service, as a verification result, even though the scope received from the information processing apparatus includes a scope for a prohibition on use of the service using the second-type token.

6. The authentication server system according to claim 1, wherein the issuance unit issues the first-type token if authentication information input via an authentication screen is determined to be appropriate, and the issuance unit issues the second-type token if transfer of user authority in the service to the authorized client is determined to be authorized via an authorization confirmation screen.

7. The authentication server system according to claim 1, wherein, if the first-type token is received, the verification unit determines whether user information of the user operating the terminal is being registered in the authentication server system.

8. A method executed by an authentication server system communicable with an information processing apparatus including a service that provides a specific function to a terminal and an authorized client, the method comprising:
issuing a first-type token for verification of whether a user operating the terminal is a valid user and a second-type token for verification of whether the service is usable with authority transferred to the authorized client cooperating with the service;
checking for verification based on a token received with a verification request and a scope from the information processing apparatus, which is a requestor of the checking, regardless of a type of the token issued by the issuing; and
notifying a verification result,
wherein, authority associated with a token is not checked if the first-type token is received, and authority associated with a token is checked and it is determined whether the scope is within a range of the authority associated with the token if the second-type token is received,
wherein, in a case where the authorized client uses a first application programming interface (API) of the information processing apparatus, the information processing apparatus transmits the scope not including a value indicating a prohibition on use of the service using the second-type token to the checking step and requests the checking step to perform the checking, and
wherein, in a case where the authorized client uses a second API of the information processing apparatus, the information processing apparatus transmits the scope including a value indicating a prohibition on use of the service using the second-type token to the checking step and requests the checking step to perform the checking.

9. A computer-readable storage medium storing computer executable instructions for causing an authentication server system communicable with an information processing apparatus including a service that provides a specific function to a terminal and an authorized client to execute a method, the method comprising:
issuing a first-type token for verification of whether a user operating the terminal is a valid user and a second-type token for verification of whether the service is usable with authority transferred to the authorized client cooperating with the service;
checking for verification based on a token received with a verification request and a scope from the information processing apparatus, which is a requestor of the checking, regardless of a type of the token issued by the issuing; and
notifying a verification result,
wherein, authority associated with a token is not checked if the first-type token is received, and authority associated with a token is checked and it is determined whether the scope is within a range of the authority associated with the token if the second-type token is received,
wherein, in a case where the authorized client uses a first application programming interface (API) of the information processing apparatus, the information processing apparatus transmits the scope not including a value indicating a prohibition on use of the service using the second-type token to the checking step and requests the checking step to perform the checking, and
wherein, in a case where the authorized client uses a second API of the information processing apparatus, the information processing apparatus transmits the scope including a value indicating a prohibition on use of the service using the second-type token to the checking step and requests the checking step to perform the checking.

10. The method according to claim 8, wherein in the checking step, the scope received from the information processing apparatus includes a scope for use of the service requested by the authorized client to the information processing apparatus.

11. The method according to claim 8, wherein in the checking step, in a case where the authorized client uses the second API of the information processing apparatus, if the authorized client transmits the first-type token to the checking step, which corresponds to a case where the checking step does not check authority associated with the token, the checking step notifies the information processing apparatus that the authorized client has the authority.

12. The method according to claim 8, wherein in the checking step, if the second-type token is received, the checking checks authority associated with the authorized client based on the token and determines whether the scope is within a range of the authority associated with the authorized client, and
wherein, if the scope is determined to be within the range of the authority associated with the token and the scope is determined to be within the range of the authority associated with the authorized client, the checking notifies that the service is usable with the authority transferred to the authorized client cooperating with the service, as a verification result.

13. The method according to claim 8, wherein in the checking step, if authority associated with the authorized client is determined to be a specific authority, the checking notifies that the service is usable with the authority transferred to the authorized client cooperating with the service, as a verification result, even though the scope received from the information processing apparatus includes a scope for a prohibition on use of the service using the second-type token.

14. The method according to claim 8, wherein in the checking step, the issuing issues the first-type token if authentication information input via an authentication screen is determined to be appropriate, and the issuing issues the second-type token if transfer of user authority in the service to the authorized client is determined to be authorized via an authorization confirmation screen.

* * * * *